Feb. 22, 1927.

W. SARANCHUK

LINES GUARD

Filed Dec. 21, 1925

WILLIAM SARANCHUK
INVENTOR.

BY Harold C. Shipman
ATTORNEY.

Patented Feb. 22, 1927.

1,618,356

UNITED STATES PATENT OFFICE.

WILLIAM SARANCHUK, OF FERGUSON FLATS, ALBERTA, CANADA.

LINES GUARD.

Application filed December 21, 1925. Serial No. 76,730.

This invention has relation to certain new and useful improvements in a lines guard which may be readily attached to the tongue of a wagon or other vehicle, agricultural implement or other device to be drawn by draft animals.

This invention has for an object the provision of a lines guard of the character stated which will be of extremely simple construction, may be readily and cheaply manufactured and will be highly efficient in use, effectively retaining the martingale in proper position on the neck yoke and also prevent the lines from becoming caught on the end of the tongue.

The invention has for a further object the provision of a lines guard of the character stated in which the lines guard will be constructed and mounted in such a manner that the neck yoke will be prevented from working off of the end of the tongue and which will also compel the draft animals to stand the strain equally when backing and when climbing or descending a hill.

The invention has for a still further object the provision of a lines guard of the character stated which may be readily attached to neck yokes of various lengths and diameters or detached therefrom, as desired.

With the foregoing and other objects in view as will appear as the description proceeds the invention consists in the novel construction combination and arrangement of co-operating parts as hereinafter more specifically set forth, claimed and shown in the accompanying drawings forming a part of the present application and in which:—

Figure 1:
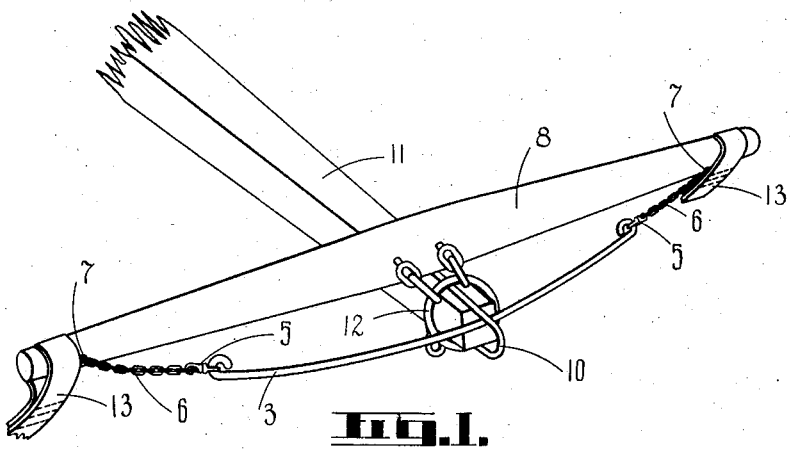
Figure 1 is a perspective view of the lines guard in use.
Figure 2:
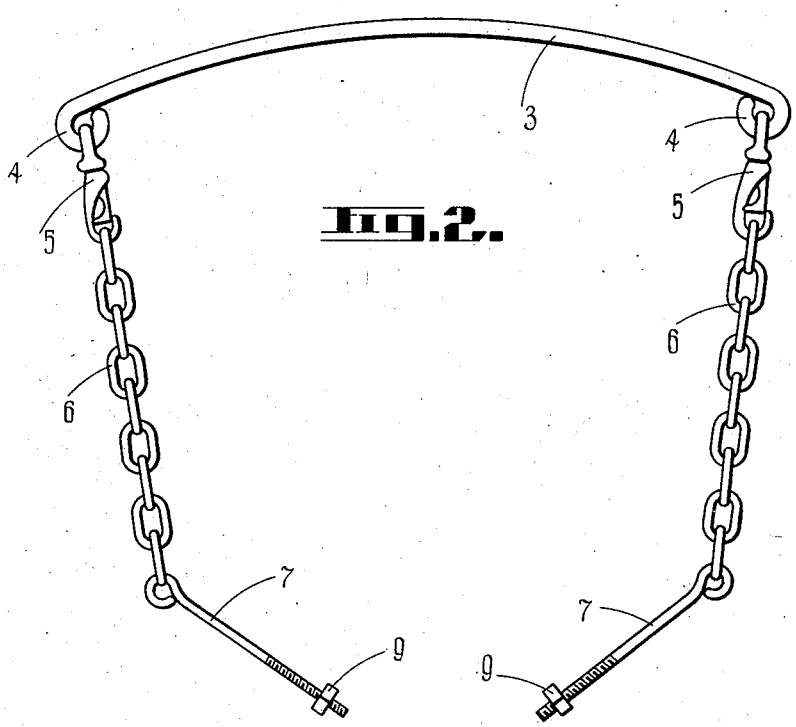
Figure 2 is a detail view of the lines guard, removed.

Referring more in detail to the drawing in which similar reference characters designate corresponding parts throughout the several views, 3 indicates a curved bar forming the main portion of the lines guard and having its opposite ends turned back to form the eyes 4, as shown clearly in the drawings. Suitable snap hooks 5 are secured in the eyes 4 to hold the flexible end members 6 of the lines guard and which members 6 are preferably in the form of chains. Suitable attaching members 7 are carried on the free ends of the flexible end members 6. The members 7 are shown as being in the form of bolts for engagement transversely through the end portions of the neck yoke 8, after which the nuts 9 or similar members may be threaded upon the free ends of the bolts 7. The main member 3 of the lines guard is extended through the staple member 10 projecting from the end of the tongue 11, as clearly shown in Figure 1. It is also to be understood that the neck yoke 8 carries the usual mounting ring 12 for mounting the neck yoke 8 upon the tongue 11. The martingales 13 are also mounted in the usual manner, as clearly indicated in Figure 1.

It is believed the complete construction and operation of the lines guard may now be apparent to parties familiar with this art without further detailed construction. It may be briefly stated, however, that the lines guard may be readily connected with the neck yoke 8 or removed therefrom, as desired. Furthermore the length of the flexible connecting end members 6 of the lines guard may be readily adjusted as required by the ring of the neck yoke 8. When the lines guard is employed, as shown in the drawing, the lines or reins will be prevented from catching on the end of the tongue 11 and thereby causing considerable annoyance if not resulting in an accident. It is also apparent that the lines guard will serve to prevent the martingales 13 from working off of the neck yoke 8 but will permit them to ride along the neck yoke when the draft animals are not equally sharing the load. This automatic adjustment of the martingale 13 will serve to equalize the strain upon the draft animals and compel each animal to carry half of the load in backing or ascending and descending inclines as well as when moving along a substantially level surface.

While the preferred embodiment of the invention has been disclosed it is to be understood that minor changes in the details of construction and arrangement of parts may be resorted to within the scope of what is claimed without departing from the spirit of the invention.

What I claim as new is:

1. A lines guard comprising a main member adapted to ride across the end of a draft tongue and flexible end connecting members carried by said main member adapted for attachment to the end portions of a neck yoke mounted on said draft tongue.

2. A lines guard comprising an arcuate main member adapted to work through a guide on the end of a draft tongue, adjustable end connecting members carried by said main member and adapted for detachable connection with the end portions of a neck yoke positioned on the draft tongue.

3. A lines guard comprising an arcuate bar forming the main member and having eyes formed at its opposite ends, said arcuate bar being adapted for movement across the end of a draft tongue and within a guide member mounted on said end of the draft tongue, flexible connecting members extended from said eyes, and attaching members carried by said flexible end members for transverse engagement through the end portions of a neck yoke working on the draft tongue.

In testimony whereof, I affix my signature.

WILLIAM SARANCHUK.